(12) United States Patent
Whitney et al.

(10) Patent No.: US 7,066,808 B2
(45) Date of Patent: Jun. 27, 2006

(54) AIRCRAFT CABIN MULTI-DIFFERENTIAL PRESSURE CONTROL SYSTEM

(75) Inventors: Thomas J. Whitney, Tucson, AZ (US); Thomas L. Lui, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 84 days.

(21) Appl. No.: 10/817,460

(22) Filed: Apr. 2, 2004

(65) Prior Publication Data

US 2005/0227605 A1    Oct. 13, 2005

(51) Int. Cl.
*B24D 13/00*    (2006.01)
(52) U.S. Cl. ..................... 454/70; 244/118.5
(58) Field of Classification Search .................. 454/70, 454/73, 74, 75, 76; 244/118.5
See application file for complete search history.

(56) References Cited

U.S. PATENT DOCUMENTS

| | | | |
|---|---|---|---|
| 3,559,559 A * | 2/1971 | Furlong et al. | 454/73 |
| 3,974,752 A * | 8/1976 | Burgess et al. | 454/73 |
| 4,164,895 A | 8/1979 | Aldrich et al. | |
| 4,164,898 A | 8/1979 | Burgess et al. | |
| 4,164,899 A | 8/1979 | Burgess | |
| 4,553,474 A | 11/1985 | Wong et al. | |
| 5,083,451 A | 1/1992 | Kling | |
| 5,201,830 A | 4/1993 | Braswell | |
| 5,312,072 A * | 5/1994 | Eklund | 244/118.5 |
| 5,334,090 A | 8/1994 | Rix | |
| 5,520,578 A * | 5/1996 | Bloch et al. | 454/74 |
| 6,452,510 B1 | 9/2002 | Zysko | |
| 2002/0055809 A1 | 5/2002 | Westphal | |
| 2003/0157875 A1 | 8/2003 | Horner et al. | |

\* cited by examiner

*Primary Examiner*—Derek S. Boles
(74) *Attorney, Agent, or Firm*—Ingrassia Fisher & Lorenz

(57) ABSTRACT

An aircraft pneumatic cabin pressure control system that is adapted to prevent the difference between cabin pressure and atmospheric pressure from exceeding a threshold value wherein the threshold value varies in relation to aircraft altitude. In some instances the control system includes at least one outflow valve adapted to prevent the difference between cabin pressure and atmospheric pressure from exceeding a threshold value, and the control system is adapted to override the outflow valve at predetermined altitudes. The control system may implement a method for controlling the cabin pressure of an aircraft using a pneumatic cabin pressure control system that includes an outflow valve comprising at least two pressure input ports, the method comprising coupling an isolation valve to an input port of the outflow control valve and utilizing the interrupt valve to isolate the outflow valve input port to which the isolation valve is coupled from pressure changes.

9 Claims, 2 Drawing Sheets

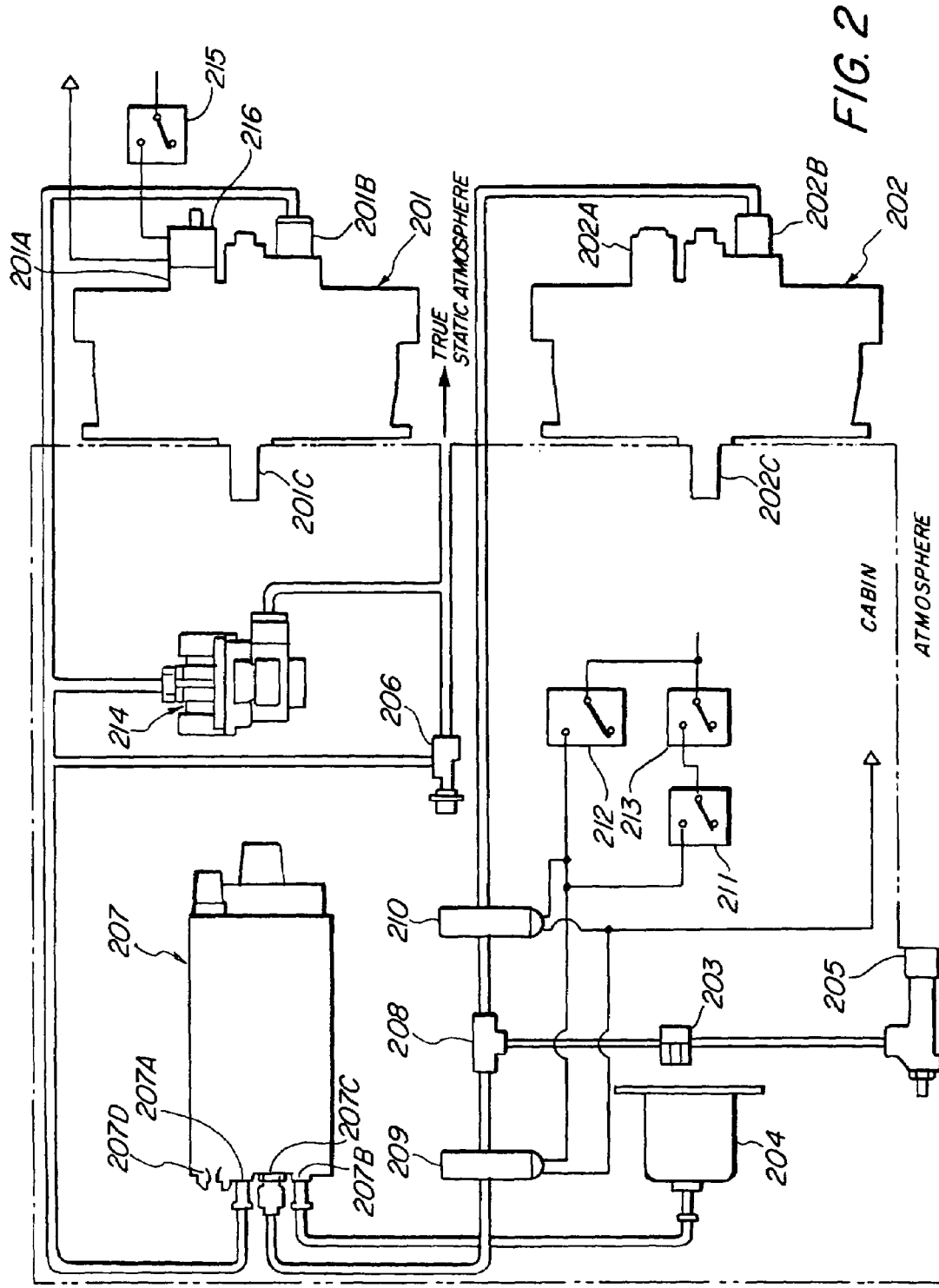

AIRCRAFT CABIN MULTI-DIFFERENTIAL PRESSURE CONTROL SYSTEM

FIELD OF THE INVENTION

The present invention relates generally to aircraft pneumatic cabin pressure control systems.

BACKGROUND OF THE INVENTION

Passenger aircraft typically utilize a cabin pressure control system (CPCS) to control changes in cabin pressure. As such, under the influence of the CPCS, cabin pressure at times may be equal to and change at the same rate as external pressure (the pressure of the atmosphere on the outside of the fuselage, hereinafter "atmospheric pressure" or "atmosphere pressure"), may differ from and change at a different rate than the external atmospheric pressure, and may differ from but change at the same rate as the external atmospheric pressure. The ranges of acceptable cabin pressures and the rates at which it can change are generally regulated by the United States Federal Aviation Administration in accordance with various industry standards such as those promulgated by the Society of Automotive Engineers.

FIG. 1 is a schematic view of a pneumatic CPCS 100. The CPCS 100 is considered pneumatic in that it utilizes pneumatically actuated valves to control cabin pressure, and does not utilize an electronic control system other than to override pneumatic control. Any control system utilizing a microprocessor, microcontroller, or electronic logic circuit in conjunction with one or more electronic pressure transducers to control cabin pressure is not a pneumatic CPCS as the term is used herein.

The CPCS 100 includes a cabin air pressure outflow valve controller 107, two cabin air pressure outflow/safety valves 101 and 102, an auxiliary volume tank 104, an air check valve 103, a jet ejector (pump) 105, a manual control valve 106, and associated pneumatic tubing, electrical wiring, and equipment including two coaxial solenoid valves 109 and 110, a control line orifice tee fitting 108, a throttle switch 111, a depressurization switch 112, and a landing gear switch 113.

Aircraft electrical power is supplied to the CPCS 100 at nodes 120A and 120B for operation of the dial lighting (28 Vdc) of controller 107 and for operation of the two solenoid valves 109 and 110 (28 Vdc). A regulated supply of engine bleed air is supplied to the CPCS 100 for operation of the jet ejector 105.

The controller 107, the manual control valve 106, and the depressurization switch 112 function as the interface between the crew of the aircraft and the CPCS 100, and are accessible to the crew in flight. Both the outflow valve (101) and the safety valve (102) are mounted on the unpressurized side of the cabin pressure bulkhead 121.

The controller 107 is pneumatically connected to the CPCS 100 through three ports: VALVE, TANK, and VACUUM (107A, 107B, and 107C). The controller 107 VALVE port 107A is pneumatically connected to the outflow valve 101 control chamber through outflow valve 101 port 101B to provide control pressure for operation of the outflow valve 101. The controller 107 TANK port 107B is connected to the auxiliary volume tank 104, which is mounted close to the controller 107. Low pressure needed for operation of the controller 107 is provided by the jet ejector 105, which is connected to the controller 107 VACUUM port 107C through the air check valve 103, the orificed tee fitting 108, and a normally open solenoid valve 109.

The jet ejector 105 also is connected to port 102B of the safety valve 102 through the air check valve 103, the orificed tee fitting 108, and a normally closed solenoid valve 110 to provide the low pressure in the safety valve 102 control chamber that is needed for inflight depressurization and for unpressurized ground operation.

Both the outflow valve 101 and the safety valve 102 are connected to a source of true static atmospheric pressure for cabin-to-atmosphere pressure sensing through the ports 101A and 102A.

The manual control valve 106 is connected on one side to the control line between the controller 107 VALVE port 107A and the port 101B of the outflow valve 101. The other side of the manual control valve 106 is connected to a source of true static atmospheric pressure. Opening the manual control valve 106 reduces pressure in the outflow valve 101 control chamber, opening the outflow valve 101. The manual control valve 106 effectively controls cabin pressure from the unpressurized condition to the positive pressure differential limit with the controller 107 inoperative.

Both the outflow and the safety valves (101 and 102) sense cabin pressure through the ports 101C and 102C for pressure relief operation.

Control of cabin pressure is obtained by regulating the rate of exhaust of the cooled engine bleed air that is provided for pressurization and ventilation of the aircraft cabin. Operation of the CPCS 100 is entirely pneumatic, except when switching between ground and flight operating modes and during inflight depressurization. Mode switching and inflight depressurization are accomplished through the solenoid operated shutoff valves 109 and 110. The CPCS 100 maintains cabin pressure within specification requirements when operated within design parameters.

Prior to operation of the CPCS 100, all components are in a static condition and there is no aircraft vacuum and no cabin air inflow. All pressures are equal, and the poppet valves in the outflow valve 101 and the safety valve 102 are spring-loaded closed.

During ground operation, prior to flight, with aircraft electrical power applied to the CPCS 100, the landing gear switch 113 closed (ground position), no takeoff power, and the cabin depressurization switch in 112 the PRESSURIZE position, the solenoid air valve 110 is open and the solenoid valve 109 is closed.

When bleed air is applied to the CPCS 100, pressure in the safety valve 102 control chamber is reduced because of the low pressure induced at the port 102B by the jet ejector 105. This decrease in control chamber pressure increases the cabin-to-control chamber pressure differential and opens the safety valve poppet. With the solenoid valve 109 closed, the outflow valve 101 remains closed because there is no vacuum applied to the controller 107 and, therefore, no pressure differential across the outflow valve diaphragm. The aircraft cabin remains in the unpressurized condition because of the open safety valve 102.

Prior to takeoff, the safety valve 102 is open; the outflow valve 101 remains closed until takeoff power is applied. When takeoff power is applied, electrical power is removed from the solenoid valve 110 causing it to close and electrical power is removed from the solenoid valve 109 causing it to open. With the solenoid valve 110 closed, the safety valve begins to move toward the closed position. With the solenoid valve 109 open, vacuum is applied to the controller 107. At this time, the controller 107 begins to apply a low reference pressure to the control chamber of the outflow valve 101 via the port 101B.

When the cabin altitude (cabin pressure is set by specifying an equivalent altitude setting rather than a specific pressure setting) selected on the controller is above field elevation, the controller bellows is retracted (compressed) against the lower bellows stop causing the reference pressure metering valve to be fully open. With the solenoid valve 109 open (and aircraft vacuum applied to the VACUUM port 107C of the controller 107), cabin air enters the controller 107 reference pressure chamber through the cabin air filter orifice 107D and flows through the reference pressure metering valve to aircraft vacuum. The pressure decrease that is caused by air passing through the cabin air filter orifice 107D creates a reference pressure in the controller 107 reference pressure chamber that is slightly less than cabin pressure.

The pressure in the controller 107 rate chamber tends to follow reference pressure, but changes more slowly because of the restriction in the rate control valve. This restriction creates a pressure differential across the controller 107 rate diaphragm. The rate diaphragm then moves in response to this pressure differential and tends to close the reference pressure metering valve. Reference pressure then decays at the same rate at which cabin rate pressure decays.

The outflow valve 101 control chamber is connected directly to the controller 107 reference pressure chamber; therefore, the controller 107 reference pressure is sensed in the outflow valve 101 control chamber at the valve diaphragm and upper poppet.

As air flows into the aircraft cabin, the increase in cabin pressure is sensed at the outflow valve 101 diaphragm. The increasing cabin-to-reference pressure differential then tends to open the outflow valve 101 poppet. When cabin pressure exceeds reference pressure plus the force of the poppet valve return spring, the poppet opens, and cabin pressure begins to track changes in reference pressure. The controller 107 reference pressure then controls the cabin pressure rate of change at the rate selected on the controller 107 through modulation of the outflow valve poppet.

As aircraft altitude increases, cabin altitude increases at the selected rate of change until the preset cabin altitude is reached. The absolute bellows in the controller 107 senses the change in cabin pressure, and expands slightly to a modulating position between the bellows stop plates. The expanding bellows repositions the reference pressure metering valve toward the closed position, which restricts the flow of reference pressure air and causes a decrease in the reference pressure rate of change. As the rate of change decreases, reference pressure and rate pressure equalize. With no pressure differential across the rate diaphragm, the diaphragm ceases to contribute to the positioning of the reference pressure metering valve. Reference pressure is then controlled at a constant value by the controller 107 absolute bellows. When cabin pressure equals the reference pressure plus poppet return spring force cabin pressure is maintained at the selected cabin altitude.

Should the aircraft climb to an altitude where the cabin-to-atmosphere pressure differential (Delta-P) equals or exceeds the calibrated setting of the outflow/safety valves (101 and 102) the pressure relief function overrides the automatic pressure control function, and the cabin pressure rate of change begins to track aircraft altitude range of change. It should be noted that, if the aircraft climbs at a high rate with a low cabin rate selected on the controller 107, the positive pressure relief function described could be activated before the aircraft reaches the selected altitude.

As the aircraft climbs, the differential control diaphragm assembly in the outflow valve 101 senses the increasing control chamber-to-atmosphere pressure differential. As this pressure differential reaches the calibrated pressure relief point (Relief-P), the differential control metering valve modulates open, releasing control chamber air to atmosphere. The outflow valve 101 poppet then modulates to maintain cabin pressure at the preset positive pressure differential setting, Relief-P, of the outflow valve 101.

Before actuation of the safety valve 102, air at cabin pressure enters the safety valve 102 control chamber through the cabin air filter. As the aircraft climbs, the differential control diaphragm assembly in the safety valve 102 senses the increasing cabin-to-pressure atmosphere pressure differential. As this pressure differential reaches the calibrated pressure Relief-Point, Relief-P, the differential control metering valve modulates open, releasing control chamber air to atmosphere. The safety valve poppet then modulates to maintain cabin pressure at the preset positive pressure differential setting, Relief-P, of the safety valve 102.

When the aircraft stops climbing, if actual cabin altitude is greater than selected cabin altitude, the CPCS 100 will remain on positive pressure differential control. If, however, when the aircraft stops climbing, actual cabin altitude is less than selected cabin altitude, cabin altitude continues to increase (but at the selected rate-of-change) until actual cabin altitude equals selected cabin altitude.

If actual cabin altitude is greater than selected cabin altitude and the aircraft descends, the cabin altitude returns toward selected cabin altitude on rate-of-change control operation until the cabin altitude reaches the selected altitude.

If an unpressurized condition is desired for an emergency (such as smoke in the cabin), setting the depressurization switch 112 to the "depressurize" position supplies 28 Vdc electrical power to the two solenoid air valves 109 and 110. The normally open solenoid air valve 109 closes and shuts off aircraft vacuum to the controller, which closes the outflow valve. The normally closed solenoid air valve 110 opens and allows aircraft vacuum to evacuate the safety valve control chamber, which opens the safety valve 102. With the outflow valve 101 closed and the safety valve 102 open, cabin air is exhausted to atmosphere, quickly depressurizing the aircraft cabin. It should be noted that depressurization of the cabin at aircraft altitudes above 10,000 ft (msl) requires an immediate aircraft descent.

Repressurizing the aircraft cabin following depressurization is accomplished by setting the depressurization switch 112 to the "pressurize" position, which opens the electrical circuits to the two solenoid air valves 109 and 110. The solenoid air valve 110 closes, shutting off aircraft vacuum to the safety valve. Air at cabin pressure then enters the safety valve 102 control chamber through the cabin air filter, and the safety valve 102 closes. The solenoid air valve 109 opens, applying aircraft vacuum to the controller 107. Automatic control functions resume, and the CPCS 100 operates on cabin rate-of-change control until the selected cabin altitude is regained.

When atmospheric pressure exceeds cabin pressure, potentially due to a loss of cabin air inflow during descent, a negative pressure differential exists across the diaphragm of both the outflow valve 101 and the safety valve 102. When the control chamber-to-atmosphere pressure differential is sufficient to overcome the force of the poppet valve return springs, the poppet valves open and allow air at atmospheric pressure to flow into the cabin until cabin pressure and atmospheric pressure are approximately equal. This prevents a negative pressure differential from exceeding aircraft structural limits.

A standby manual control function is incorporated in the CPCS 100. This function provides for control of cabin pressure in the event of any controller malfunction that results in the outflow valve remaining closed.

The manual control valve 106 connects the outflow valve control line to the true static atmosphere pressure, and allows the crew to manually control pressure in the outflow valve 101 control chamber. Manual control of control chamber pressure controls the outflow valve 101 poppet, thereby providing control of cabin altitude and rate of change.

If the aircraft descends from cruise altitude, under normal circumstances no adjustment to the CPCS 100 is necessary. However, if the aircraft descends a sufficient amount to reach the selected cabin altitude, it is desirable to reselect (via the controller 107) a lower cabin altitude for passenger and crew comfort. Reselecting a lower cabin altitude prevents unpressurized operation and allows cabin altitude to decrease on rate of change control to the reselected altitude.

If the aircraft climbs from cruise altitude high enough for the CPCS 100 to begin controlling on positive pressure relief, it is desirable to reselect (via the controller 107) a higher cabin altitude for passenger and crew comfort. Reselecting a higher cabin altitude prevents positive pressure relief operation and allows cabin altitude to increase on rate of change control to the reselected altitude.

During descent and in preparation for landing, it is necessary to reset the cabin altitude selector to an altitude approximately 500 feet above landing field elevation. This reselection should be accomplished far enough in advance of descent initiation to prevent the aircraft from descending through cabin altitude, which may occur because of a low cabin rate of change selection.

Upon reselection of a lower cabin altitude, the actuator and absolute bellows of the controller 107 tend to move the reference pressure metering valve toward the closed position. The resulting reference pressure increase causes a corresponding increase in the outflow valve 101 control chamber pressure, and the poppet valve modulates toward the closed position, increasing cabin pressure on rate of change control until the selected cabin altitude is attained.

The speed at which reference pressure air in the controller 107 flows through the rate control valve into the rate pressure chamber controls the rate of change of cabin pressure. When the pressure differential across the rate diaphragm is approximately zero, reference pressure is essentially constant and cabin altitude stabilizes at the selected cabin setting. So long as a pressure differential exists across the rate diaphragm, the system remains on rate of change control.

As the descending aircraft reaches the preselected cabin altitude, the outflow valve 101 poppet modulates toward the fully open position. Then, as the aircraft descends through the preselected cabin altitude, the cabin becomes unpressurized, and follows the aircraft rate of descent to touchdown. During touchdown, the landing gear switch closes. With the landing gear switch closed and the engine at less than takeoff power, the solenoid valve 109 closes and the solenoid valve 110 opens. With the solenoid valve 109 closed, aircraft vacuum to the controller 107 is shut off, causing the outflow valve poppet to close. With the solenoid valve 110 open, aircraft vacuum reduces the safety valve 102 control chamber pressure and the safety valve 102 poppet moves to the fully open position, allowing residual air at cabin pressure to flow to ambient.

Unfortunately, the use of a CPCS such as the CPCS 100 of FIG. 1 causes problems if an aircraft is to be flown at higher altitudes such that the desired Delta-P at the higher altitudes exceeds the Relief-P setting of valves 101 and 102. Once Delta-P reaches the Relief-P of valves 101 and 102, cabin pressure changes follow atmospheric pressure changes, quite possibly at an uncomfortably high rate of change. Although this could be prevented by simply increasing the Relief-P setting of the CPCS 100, doing so will likely result in subjecting the aircraft structure to higher differential pressures at lower altitudes, which increases structural fatigue.

Thus, it should be appreciated that there is a need for methods and apparatus that facilitate pneumatic cabin pressure control systems that allow for changes to the maximum differential pressure in relation to aircraft altitude, and more particularly allow for increased maximum differential pressures at higher altitudes but not at lower altitudes.

The present invention fulfills this need as well as others.

SUMMARY OF THE INVENTION

The present invention is directed to an aircraft pneumatic cabin pressure control system adapted to prevent the difference between cabin pressure and atmospheric pressure from exceeding a threshold value wherein the threshold value varies in relation to aircraft altitude. In some embodiments the threshold value alternates between at least two values where it is a first value while the aircraft is below a certain altitude and a second higher value while the aircraft is above that altitude, and may alternate between exactly two predetermined values.

In the embodiments already described or in other embodiments, the control system may comprise at least one outflow valve adapted to prevent the difference between cabin pressure and atmospheric pressure from exceeding a threshold value wherein the control system is adapted to override the outflow valve pressure relief function at predetermined altitudes, and may, when overriding the outflow valve pressure relief function at predetermined altitudes, do so by isolating a pressure input port of the outflow valve from changes in atmospheric pressure. In such embodiments the outflow valve input port may be isolated whenever the aircraft exceeds a pre-determined altitude, and be accomplished via an aneroid switch closing a solenoid valve.

In the embodiments already described or in other embodiments, the control system may comprise a safety valve in addition to at the least one outflow valve, wherein both the outflow valve and safety valve are adapted to prevent the difference between cabin pressure and atmospheric pressure from exceeding a threshold value and the threshold value for the outflow valve differs from that for the safety valve. In some such embodiments the threshold value for the outflow valve may be set lower than the threshold value of the safety valve.

In the embodiments already described or in other embodiments, the control system may further comprise a secondary differential controller that causes the outflow valve to open if the difference between cabin pressure and atmospheric pressure exceeds the threshold value of the secondary differential controller, and to do so even if the outflow valve input port has been isolated by the solenoid valve. It is contemplated that at least for some aircraft it would be advantageous if the threshold value for the outflow valve is between about 4.8 and 5.0 psi, and the threshold value of both the safety valve and secondary differential controller is between about 5.4 and 5.6 psi, and even more advantageous if the threshold value of the outflow valve is about 4.94 psi and the threshold value of both the safety valve and secondary differential controller is about 5.5 psi, and the aneroid switch closes the solenoid valve if the aircraft exceeds an altitude of 26,000 feet.

The CPCS 200 can also be characterized as an aircraft pneumatic cabin pressure control system comprising an outflow valve having a true static atmosphere input port, a solenoid valve coupled to the input port, and an aneroid switch electrically coupled to the solenoid valve such that when a certain altitude is reached and/or exceeded, the aneroid switch causes the solenoid valve to close so as to isolate the input port from pressure changes that occur while the solenoid valve is closed. In such embodiments, the control system may comprise a secondary differential controller that causes the outflow valve to open if the difference between cabin pressure and atmospheric pressure exceeds the threshold value of the secondary differential controller, and to do so even if the outflow valve input port has been isolated by the solenoid valve.

The CPCS 200 can also be characterized as implementing a method for controlling the cabin pressure of an aircraft using a pneumatic cabin pressure control system that includes an outflow valve comprising at least two pressure input ports, the method comprising coupling an isolation valve to an input port of the outflow control valve and utilizing the interrupt valve to isolate the outflow valve input port to which the isolation valve is coupled from pressure changes. Such a method might also comprise causing the interrupt valve to isolate the outflow valve input port whenever the aircraft exceeds a pre-determined altitude, operating the interrupt valve to de-isolate the outflow valve input port whenever the aircraft drops below a pre-determined altitude, and/or causing the outflow valve to open when the aircraft Delta-P exceeds a second pre-determined value that is higher than the pre-determined Delta-P value when the outflow valve input port is not isolated.

It is contemplated that the present invention provides a mechanism by which undesirably high rates of change to cabin pressure can be prevented when an aircraft is flown at a higher altitude than it was originally intended to be flown, but without subjecting the aircraft to higher differential pressures when it is not being flown at such higher altitude.

These and other features and advantages of the embodiments of the invention will become apparent from the following detailed description, taken in conjunction with the accompanying drawings, which illustrate, by way of example the principles of the invention.

BRIEF DESCRIPTION OF THE DRAWINGS

FIG. 2 is a schematic view of a pneumatic cabin pressure control system in accordance with a preferred embodiment of the present invention.

DETAILED DESCRIPTION OF THE PRESENTLY PREFERRED EMBODIMENTS

Figure 1:
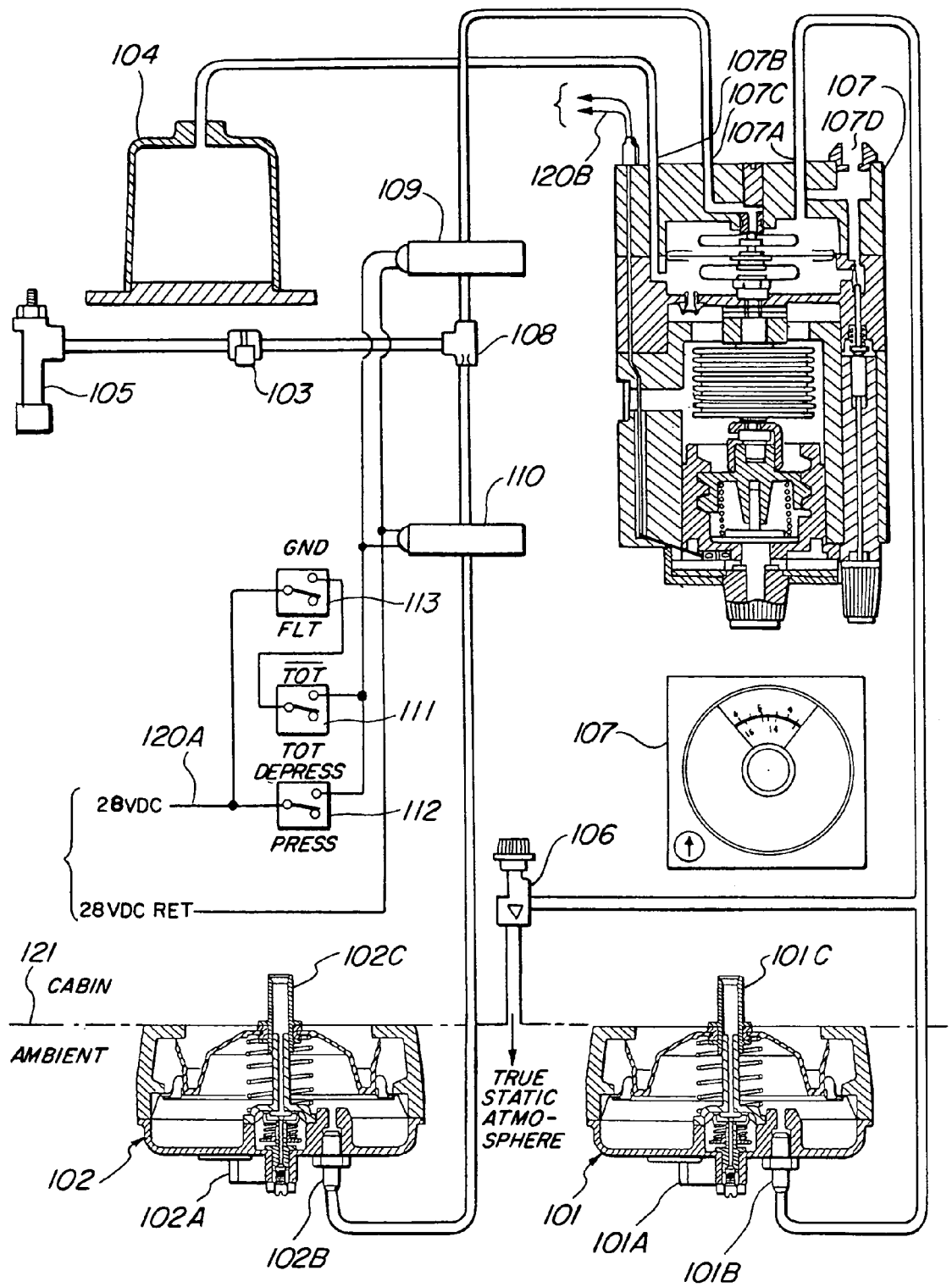
FIG. 1 is a schematic view of a prior art pneumatic cabin pressure control system.

Devices that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Referring now more particularly to the drawings, FIG. 2 illustrates a cabin pressure control system (CPCS) 200. The CPCS 200 includes a cabin air pressure controller 207, two cabin air pressure outflow/safety valves 201 and 202, an auxiliary volume tank 204, an air check valve 203, a jet ejector 205, a manual control valve 206, and associated pneumatic tubing, electrical wiring, and equipment including two coaxial solenoid valves 209 and 210, a control line orifice tee 208, a throttle switch 211, a depressurization switch 212, and a landing gear switch 213. The CPCS 200 also includes a secondary differential pressure controller 214, an aneroid altitude switch 215, and a solenoid valve 216.

The CPCS 200 includes (a) valves 201 and 202 have Relief-P values that differ from each other with Relief-P of valve 201 being set lower than that of valve 202, and (b) the CPCS 200 includes a mechanism for overriding the primary differential controller of outflow valve 201. More particularly, solenoid valve 216 is coupled to the true static atmosphere input port 201A of outflow valve 201 such that the port 201A can be held at whatever the current atmospheric pressure is at the time that the solenoid valve 216 is closed. This essentially isolates the differential controller of valve 201 from pressure changes that occur while solenoid valve 216 is closed. By coupling aneroid switch 215 to the solenoid valve 216, the valve 216 is caused to close whenever the aircraft reaches an altitude that closes switch 215.

By setting the Relief-P value of the valve 201 to a lower value than that of valve 202, and selecting/setting aneroid switch 215 so that it closes at an altitude at which the actual Delta-P value experienced by the aircraft is less than that to Relief-P of valve 202, the differential control of valve 201 is prevented from opening valve 201 while the aircraft is above the altitude at which aneroid switch 215 closes.

In addition to including solenoid valve 216 and aneroid switch 215, the CPCS 200 includes a secondary differential controller 214. Controller 214 provides a mechanism for setting an upper limit on the Delta-P value valve 201 permits, even if solenoid valve 216 is closed. In the preferred embodiment, Relief-P of controller 214 is set equal to Relief-P of valve 202.

The Relief-P of valve 201 will generally be set to the same value as it would have had in the CPCS 100, while that of valve 202 and controller 214 will be set at a higher value. As such, the CPCS 200 functions in a similar manner as the CPCS 100 until the altitude that triggers aneroid switch 215 is reached at which point the aircraft is allowed to be subjected to a higher Delta-P value than it is allowed to be subjected to at lower levels.

The CPCS 200 can be characterized as an aircraft pneumatic cabin pressure control system adapted to prevent the difference between cabin pressure and atmospheric pressure from exceeding a threshold value wherein the threshold value varies in relation to aircraft altitude. In the instance of the CPCS 200, the CPCS 100 was adapted to form the CPCS 200 by inclusion of the solenoid valve, aneroid switch and secondary differential controller. In other embodiments, a CPCS may be adapted using some other method and/or mechanism such as: the inclusion of outflow valves having differential controllers for which the Relief-P value can be adjusted while the aircraft is in flight; the use of a differential controller that include a mechanism for disabling the valve, possibly by locking it shut; and/or the use of an alternative mechanism for controlling the pressure differential seen by the valve controller.

In the CPCS 200, the threshold value varies in relation to aircraft altitude because the threshold value is the Relief-P value of the outflow valve at altitudes below which the switch is triggered, and the Relief-P value of the secondary controller at altitudes above which the switch is triggered. As such, the threshold value alternates between two values that are determined and fixed prior to flight. Alternative embodiments might also include additional outflow valves with secondary controller and different Relief-P values to permit the threshold value to have more than two values. It is also contemplated that in alternative embodiments the threshold value might be modifiable by the aircraft crew while the aircraft is in flight and/or might be modifiable by automated means either before or during a flight.

Outflow valve 201 is adapted to prevent the difference between cabin pressure and atmospheric pressure from exceeding a threshold value because it operates and is positioned to allow changes in atmospheric pressure to cause changes in cabin pressure whenever its Relief-P value is exceeded, and by doing so to hold the difference between cabin pressure and atmospheric pressure to a value less than Relief-P. Alternative embodiments may utilize valves or mechanisms other than valve 201 that are similarly adapted in that they have physical characteristics such that they function to prevent the difference between cabin pressure and atmospheric pressure from exceeding a threshold value.

The CPCS 200 can be said to be adapted to override the outflow valve differential controller at predetermined altitudes, more particularly when the aircraft exceeds a pre-determined altitude, by isolating a pressure input port of the outflow valve from changes in atmospheric pressure because it includes solenoid valve 216 and aneroid switch 215. However, as previously mentioned, the way in which a control system is adapted to override the outflow valve differential controller may vary between embodiments. In some embodiments, the valve itself may comprise a mechanism for overriding the controller, possibly by providing a mechanism for opening and/or closing the valve despite whether the Relief-P enforced by the valve differential controller is exceeded. In some embodiments, solenoid valve 216 may be replaced with a pneumatic valve or a manually operated valve. In some embodiments, aneroid switch 215 may be replaced by some other mechanism for closing valve 216 and/or for sensing the current altitude of the aircraft. In other embodiments, the valve differential controller may be isolated via a mechanism remote from the valve such as by closing an input line used to convey pressure changes to the controller.

As was previously mentioned, the CPCS 200 comprises a safety valve 202 in addition to at least one outflow valve 201, wherein both the outflow valve and safety valve are adapted to prevent the difference between cabin pressure and atmospheric pressure from exceeding a threshold value and the threshold value for the outflow valve differs from that for the safety valve. In the preferred embodiment the threshold value for the outflow valve 201 is set lower than the threshold value of the safety valve 202.

It is important to consider that overriding the differential controller of the outflow valve, and providing the outflow and safety valves with different Relief-P values, eliminates some redundancy that would otherwise exist. This is corrected by adding a second, external, differential controller to the outflow valve that remains able to control the operation of the outflow valve even when the first/primary/internal differential controller has been isolated. The secondary differential controller causes the outflow valve to open if the difference between cabin pressure and atmospheric pressure exceeds the threshold value of the safety valve, and to do so even if the outflow valve input port has been isolated by the solenoid valve.

It is contemplated that at least for some aircraft it would be advantageous if the threshold value for the outflow valve is between about 4.8 and 5.0 psi, and the threshold value of the safety valve is between about 5.4 and 5.6 psi, and even more advantageous if the threshold value of the outflow valve is about 4.94 psi and the threshold value of the safety valve is about 5.5 psi, and the aneroid switch closes the solenoid valve if the aircraft exceeds an altitude of 26,000 feet.

The CPCS 200 can also be characterized as an aircraft pneumatic cabin pressure control system comprising an outflow valve having a true static atmosphere input port, a solenoid valve coupled to the input port, and an aneroid switch electrically coupled to the solenoid valve such that when a certain altitude is reached and/or exceeded, the aneroid switch causes the solenoid valve to close so as to isolate the input port from pressure changes that occur while the solenoid valve is closed. It can be further characterized as comprising a secondary differential controller that causes the outflow valve to open if the difference between cabin pressure and atmospheric pressure exceeds the threshold value of the secondary differential controller, and to do so even if the outflow valve input port has been isolated by the solenoid valve.

The CPCS 200 can also be characterized as implementing a method for controlling the cabin pressure of an aircraft using a pneumatic cabin pressure control system that includes an outflow valve comprising at least two pressure input ports, the method comprising coupling an isolation valve to an input port of the outflow control valve and utilizing the interrupt valve to isolate the outflow valve input port to which the isolation valve is coupled from pressure changes. The method implemented by the CPCS 200 can further be said to comprise: causing the interrupt valve to isolate the outflow valve input port whenever the aircraft exceeds a pre-determined altitude; operating the interrupt valve to de-isolate the outflow valve input port whenever the aircraft drops below a pre-determined altitude; and causing the outflow valve to open when the aircraft Delta-P exceeds a second pre-determined value that is higher than the pre-determined Delta-P value when the outflow valve input port is not isolated. In the CPCS 200, causing the outflow valve to open does not comprise de-isolating the outflow valve input port.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A pneumatic cabin pressure control system for limiting a difference between cabin pressure and atmospheric pressure, the system comprising:

an outflow valve having a true static atmosphere input port;

a solenoid valve coupled to the input port;

an aneroid switch electrically coupled to the solenoid valve such that when a certain altitude is reached and/or exceeded, the aneroid switch causes the solenoid valve to close so as to isolate the true static atmosphere input port from pressure changes that occur while the solenoid valve is closed; and a secondary differential controller configured to open the outflow valve if the difference between cabin pressure and atmospheric pressure exceeds a threshold value of the secondary differential controller, and to do so even if the outflow valve input port has been isolated by the solenoid valve.

2. A method for limiting a difference between cabin pressure and atmospheric pressure in an aircraft using a pneumatic cabin pressure control system that includes an outflow valve comprising at least an atmospheric pressure input port, the method comprising the steps of:

selectively isolating and de-isolating the outflow valve atmospheric pressure input port from pressure changes;

opening the outflow valve if the difference between cabin pressure and atmospheric pressure exceeds a first threshold value and the outflow valve atmospheric pressure input is de-isolated; and opening the outflow valve if the difference between cabin pressure and atmospheric pressure exceeds a second threshold value and the outflow valve atmospheric pressure input is isolated.

3. The method of claim 2 further comprising:

isolating the outflow valve atmospheric pressure input port when the aircraft exceeds a pre-determined altitude.

4. The method of claim 3 further comprising:

de-isolating the outflow valve atmospheric pressure input port when the aircraft is below a pre-determined altitude.

5. An aircraft pneumatic cabin pressure control system adapted to prevent the difference between cabin pressure and atmospheric pressure from exceeding a threshold value, the system comprising:

an outflow valve having an input port adapted to be coupled to a source of atmospheric pressure, the outflow valve configured to move to an open position if the difference between cabin pressure and atmospheric pressure exceeds a first threshold value;

an isolation valve coupled to the outflow valve input port and selectively movable between an open position, in which the outflow valve input port is in fluid communication with the source of atmospheric pressure, and a closed position, in which the outflow valve input port is isolated from the source of atmospheric pressure to thereby prevent the outflow valve from opening if the difference between cabin pressure and atmospheric pressure exceeds the first threshold value; and a secondary controller coupled to the outflow valve and configured to move the outflow valve to the open position if the difference between cabin pressure and atmospheric pressure exceeds a second threshold value that is greater in magnitude than the first threshold value.

6. The system of claim 5, wherein the isolation valve is configured to move to the closed position when the aircraft is above a predetermined altitude.

7. The system of claim 5, further comprising:

a solenoid coupled to the isolation valve, the solenoid adapted to be selectively energized and de-energized to thereby move the isolation valve to the closed position and open position, respectively; and a switch operable to move between a closed position and an open position to thereby energize and de-energize, respectively, the solenoid.

8. The system of claim 7, wherein the switch moves to the closed position when the aircraft is above a predetermined altitude.

9. The system of claim 7, wherein the switch comprises an aneroid switch.

* * * * *